United States Patent [19]

Fujihira et al.

[11] Patent Number: 5,395,579
[45] Date of Patent: Mar. 7, 1995

[54] METHOD OF PRODUCING WEATHERSTRIP FOR AUTOMOTIVE VEHICLE

[75] Inventors: Junichi Fujihira; Hisashi Odawara, both of Chiba, Japan

[73] Assignee: Kinugawa Rubber Ind. Co., Ltd., Chiba, Japan

[21] Appl. No.: 955,978

[22] Filed: Oct. 2, 1992

[30] Foreign Application Priority Data

Feb. 28, 1992 [JP] Japan .................. 4-043180

[51] Int. Cl.$^6$ ...................... B29C 45/14; B29C 45/16
[52] U.S. Cl. .................. 264/254; 264/250; 264/255; 264/261
[58] Field of Search ............ 264/250, 251, 259, 261, 264/263, 177.16, 211.24, 236, 328.8, 255, 294, 254

[56] References Cited

U.S. PATENT DOCUMENTS

| | | | |
|---|---|---|---|
| 4,315,050 | 2/1982 | Rourke | 264/259 |
| 4,318,764 | 3/1982 | VanManen | 264/259 |
| 4,873,045 | 10/1989 | Fujita | 264/259 |
| 4,986,947 | 1/1991 | Shigeki et al. | 264/250 |
| 5,049,346 | 9/1991 | Yada et al. | 264/250 |

FOREIGN PATENT DOCUMENTS

| | | |
|---|---|---|
| 5261810 | 10/1950 | Japan . |
| 5890820 | 12/1981 | Japan . |
| 6118929 | 7/1984 | Japan . |

*Primary Examiner*—Jan H. Silbaugh
*Assistant Examiner*—A. Y. Ortiz
*Attorney, Agent, or Firm*—Bachman & LaPointe

[57] ABSTRACT

A method of producing a weatherstrip for an automotive vehicle is included. This weatherstrip includes generally a sliding seal portion for sealing between a vehicle body and a window glass and a weatherstrip base portion for bordering an open edge of the vehicle body. The sliding seal portion is made of rubber material with which lubricant is blended so that the lubricant bleeds out of an outer surface of the sliding seal portion with use for providing low friction against sliding movement of the window glass. The weatherstrip base portion is made of conventional rubber material including no lubricant and is one-piece molded with the sliding seal member by extrusion molding.

4 Claims, 4 Drawing Sheets

METHOD OF PRODUCING WEATHERSTRIP FOR AUTOMOTIVE VEHICLE

BACKGROUND OF THE INVENTION

1. Field of the Invention

The present invention relates generally to a weatherstrip for an automotive vehicle. More particularly, the invention relates to an improved weatherstrip including a sliding seal portion for sealing between a window glass and an open edge of a vehicle body allowing the window glass to be raised or lowered smoothly, and a process for producing same.

2. Description of the Prior Art

Japanese Utility Model First Publications Nos. 52-61810 and 58-90820 disclose a weatherstrip available to a sash-less door of an automotive vehicle. This weatherstrip is attached to an peripheral edge other than an upper edge of the sash-less door for sealing between the door and a door frame. An upper end portion of the weatherstrip defines part of a door west opening through which a window glass is raised and lowered. To the upper end portion of the weatherstrip, lubricant such as silicon is applied for reducing friction against the vertical movement of the window glass.

However, such a weatherstrip raises a drawback that an outer layer of the weatherstrip to which lubricant is applied tends to be deteriorated with age Additionally, applying lubricant to a sliding seal portion of the weatherstrip requires a complicated process, thus increasing manufacturing costs.

SUMMARY OF THE INVENTION

It is therefore a principal object of the present invention to avoid the disadvantages of the prior art.

It is another object of the present invention to provide a weatherstrip which has high durability against sliding motion of counter parts and may be manufactured at low cost.

According to one aspect of the present invention, there is provided a weatherstrip for an automotive vehicle which comprises a sliding seal portion made of rubber material including lubricant for sealing between a vehicle body and a slidable member of the vehicle and a weatherstrip base portion made of rubber material including no lubricant for bordering an open edge of the vehicle body, the weatherstrip base member being molded integrally with said sliding seal member.

In the preferred mode, a connecting portion made of rubber material including no lubricant may be provided to interconnect between the sliding seal portion and the weatherstrip base portion. Additionally, the lubricant may include a paraffin wax which has a solubility parameter different from that of other compounds of the rubber material of the sliding seal portion.

According to another aspect of the present invention, there is provided a method for molding a weatherstrip for an automotive vehicle which comprises the steps of injecting rubber material into a cavity defined in a die assembly to mold a connecting portion, injecting rubber material including lubricant into the cavity to mold a sliding seal portion for sealing between a vehicle body and a slidable member of the vehicle, vulcanizing the connecting portion and the sliding seal portion to bond these integrally with each other, and bonding a preformed weatherstrip base portion to the connecting portion.

In the preferred mode, the bonding step may include the steps of arranging the preformed weatherstrip base portion in a die assembly in alignment with the connecting portion with a given interval and injecting rubber material into the die assembly to interconnect between the weatherstrip base portion and the connecting portion under vulcanizing treatment.

BRIEF DESCRIPTION OF THE DRAWINGS

The present invention will be understood from the detailed description given hereinbelow and from the accompanying drawings of the preferred embodiments which are given for explanation and understanding only and are not intended to imply limitation to the invention.

In the drawings.

DESCRIPTION OF THE PREFERRED EMBODIMENT

Figure 1:
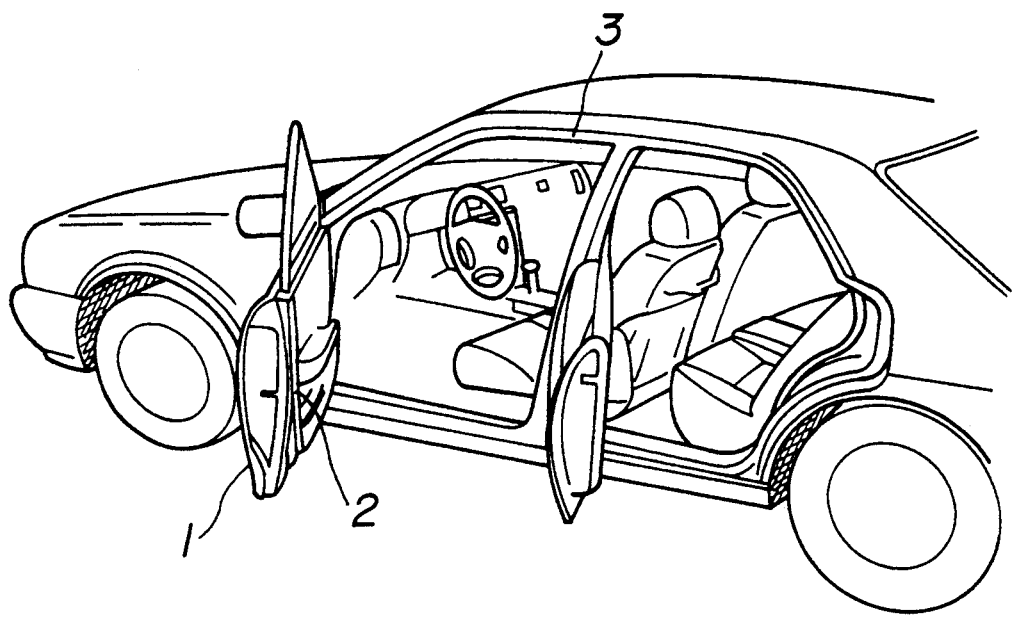
FIG. 1 is a perspective view which shows a mounting position of a weatherstrip of the present invention on an automotive vehicle.
Figure 2:
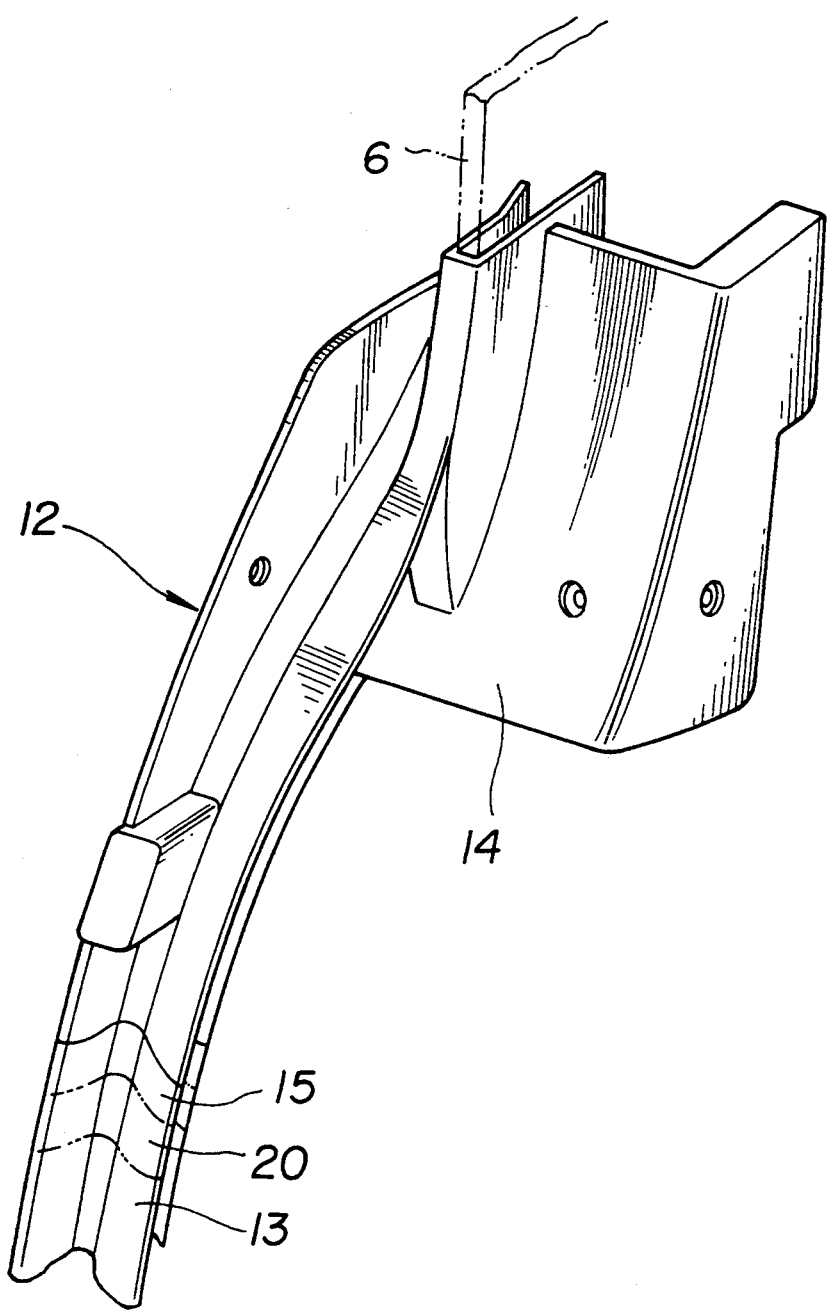
FIG. 2 is a perspective view which shows a weatherstrip according to the present invention which is attached to a sash-less door.

Referring now to the drawings, particularly to FIGS. 1 and 2, a weatherstrip 12 according to the present invention is shown which borders a circumferential edge portion other than an upper edge portion of a sash-less door 1 of an automotive vehicle.

The weatherstrip 12, as shown in FIG. 2, is one-piece molded and includes generally a weatherstrip base portion 13 for sealing a clearance between a door frame 3 (i.e., a vehicle opening) and the door 1 when being closed and a window-glass seal portion, or sliding seal portion 14 of a substantially C-shaped cross section. The sliding seal portion 14 defines part of an opening of a door west and has a low-friction inner surface which engages an edge portion of a window glass 6, allowing the window glass to be raised or lowered smoothly.

The weatherstrip base portion 13 is made of conventional rubber such as a sponge rubber material including no lubricant. The sliding seal portion 14 is made of rubber material with which lubricant such as a paraffin wax is blended.

Generally, it is known in the art that a paraffin wax has a solubility parameter different from that of conventional rubber compounds for a weatherstrip. Therefore, when the paraffin wax is blended with the weatherstrip rubber material, it tends to bleed out of an outer surface of the weatherstrip gradually with use (hereinafter, this type of rubber containing lubricant will be referred to as a bleeding-out rubber).

Accordingly, an outer surface of the sliding seal portion 14 is always wet slightly with the lubricant, thereby providing low friction to the outer surface of the sliding seal portion 14 for allowing the window glass 6 to slide smoothly. Additionally, the bleeding of the lubricant occurs gradually with use, maintaining smooth sliding characteristics over a long period of time as compared with a conventional rubber to an outer surface of which silicon is applied.

Figure 3:
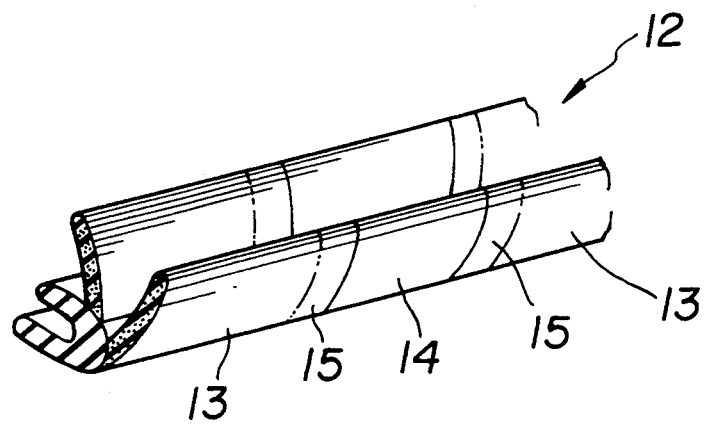
FIG. 3 is a perspective view which shows an alternate weatherstrip according to the present invention.

Referring to FIG. 3, an alternative weatherstrip 12 according to the present invention is shown. This weatherstrip 12 is suitable for bordering an edge of a drip channel and includes a sliding seal portion 14 engaging a front upper end portion of a rear door slidingly when being opened and closed and a weatherstrip base portion 13 integrally connected to both ends of the sliding seal portion 14. The sliding seal portion 14 is made of the bleeding-out rubber.

Figure 4:
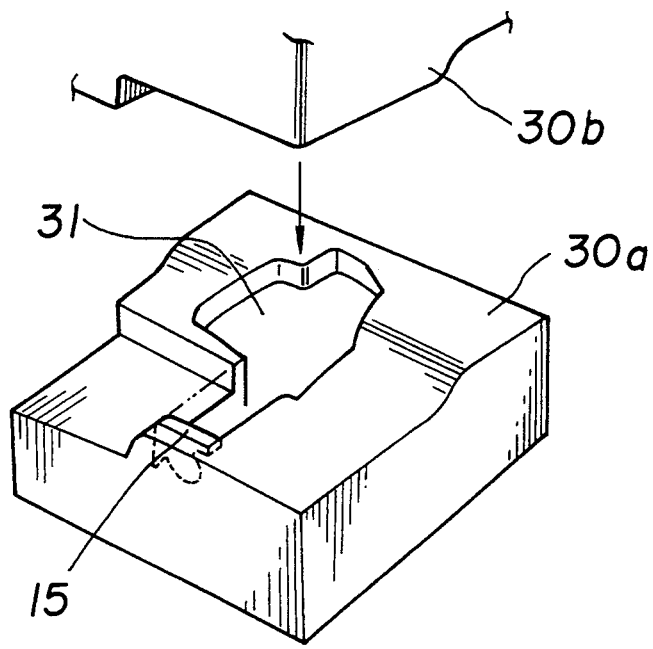
FIGS. 4 and 5 are perspective views which show dies for molding weatherstrip of the invention.

Referring to FIG. 4, there are illustrated an extrusion die assembly which includes dies 30a and 30b for molding the sliding seal portion 14. A process for producing the weatherstrip 12 according to the present invention will be described hereinbelow.

First, a connecting portion 15 is arranged in a cavity 31 defined by the dies 30a and 30b. This connecting portion 15 is made of conventional rubber compounds including no lubricant and is preformed into a preselected configuration without vulcanizing. The connecting portion 15 may not be preformed into a preselected shape when it is finish machined after molding operation. In addition, the connecting portion 15 may be formed by injecting a rubber material directly into the cavity 31.

With the above arrangement, the dies 30a and 30b are clamped together and heated to a preselected temperature. A rubber material containing lubricant is injected into the cavity 31 under a preselected pressure without vulcanizing for molding the sliding seal portion 14 which continues from the connecting portion 15. Afterwards, the connecting portion 15 and the sealing portion 14 are vulcanized to be bonded completely.

After bonding the connecting portion 15 and the sealing portion 14 under the vulcanizing treatment, these are removed from the dies 30a and 30b and then arranged in another die assembly (not shown) so that an end of the connecting portion 15 is in alignment with an end of the vulcanized weatherstrip base portion 13 with a given interval which is preformed by extrusion molding. A non-vulcanized rubber material including no lubricant is then injected into the die assembly to bond the weatherstrip base portion 13 and the connecting portion 15 under vulcanizing treatment. The connection between the connecting portion 15 and the weatherstrip base portion 13 is denoted by the reference number 20 in FIG. 2.

Figure 5:
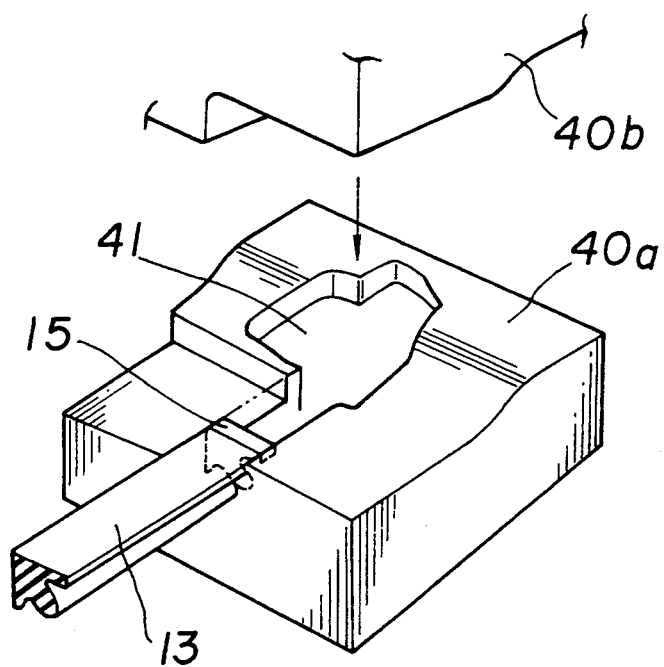

With reference to FIG. 5, an alternative process for producing the weatherstrip 12 will be described hereinbelow.

Figure 6:
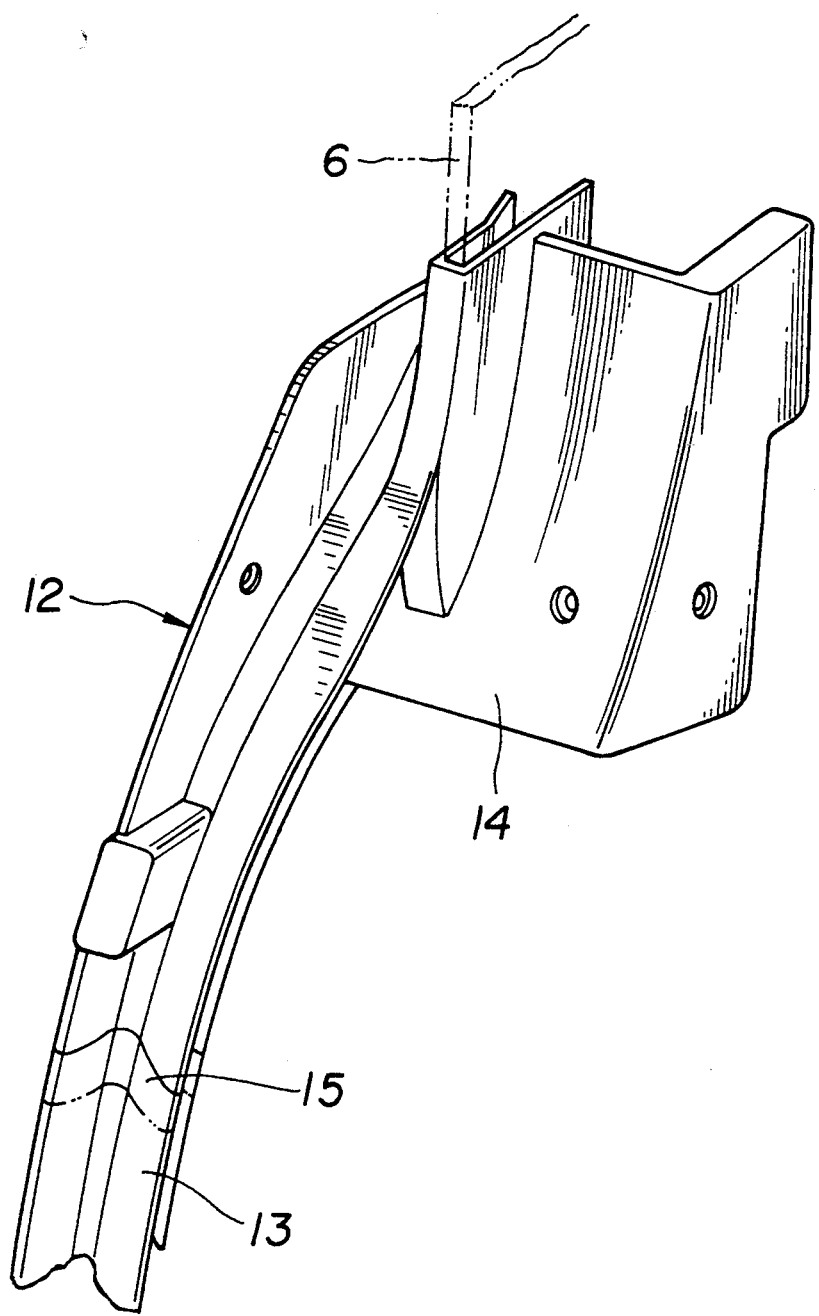
FIG. 6 is a perspective view which shows an alternative weatherstrip molded by dies shown in FIG. 5.

First, the non-vulcanized connecting portion 15 which is preformed of rubber material including no lubricant into a preselected configuration is set in a cavity 41 defined by dies 40a and 40b. The vulcanized weatherstrip base portion 13 is then arranged so that an end of the weatherstrip base portion 13 engages an end of the connecting portion 15 in the cavity 41. The rubber material containing lubricant is injected into the cavity 41 to mold the sliding seal portion 14 integrally with the connecting portion 15. Finally, under vulcanizing treatment, the sliding seal portion 14, the connecting portion 15, and the weatherstrip base portion 13 are bonded to each other completely. FIGS. 3 and 6 show the weatherstrip formed in the above manufacturing process. Similar to the above mentioned first embodiment, the connecting portion 15 may not be preformed into a preselected shape when it is finish machined after molding operation. In addition, the connecting portion 15 may be molded by injecting rubber material directly into the cavity 31.

Generally, it is known in the art that it is difficult to bond rubber containing lubricant which is relatively insoluble in other rubber compounds to vulcanized rubber and thus one-piece molding of the vulcanized weatherstrip base portion 13 and the sliding seal portion 14 made of rubber material with which lubricant is blended has not been possible. However, according to the above mentioned two processes, the connecting portion 15 including no lubricant may be bonded integrally with the sliding seal portion 14 under vulcanizing treatment and then the sliding seal portion 14 is connected to the weatherstrip base portion 13 through the connecting portion 15 for forming a one-piece weatherstrip 12.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of producing a weatherstrip for an automotive vehicle comprising the steps of:
   (a) providing a die assembly which has a cavity defined therein;
   (b) placing a shaped connecting member in said cavity, said shaped connecting member being made of a rubber compound and being non-vulcanized;
   (c) heating said die assembly to a preselected temperature;
   (d) injecting a rubber material including a lubricant into said cavity into engagement with one end portion of said connecting member to mold a sliding seal member in engagement with said one end portion of said connecting member;
   (e) vulcanizing said sliding seal member and said connecting member to integrally bond said sliding seal member to said connecting member;
   (f) then placing a shaped weatherstrip base member near an other end portion of said connecting member keeping a given interval therebetween; and
   (g) injecting non-vulcanized rubber material between the weatherstrip base member and the other end portion of said connecting member under vulcanizing treatment to connect the weatherstrip base member to said connecting member.

2. A method as set forth in claim 1, wherein the lubricant has a solubility parameter different from that of other compounds of the rubber material of said sliding seal member.

3. A method as set forth in claim 2, wherein the lubricant is a paraffin wax.

4. A method as set forth in claim 1, wherein the lubricant has a solubility parameter different from that of other compounds of said sliding seal member so that the lubricant bleeds out of an outer surface of the sliding seal member with use.

* * * * *